United States Patent
Xue et al.

(10) Patent No.: US 9,611,774 B2
(45) Date of Patent: Apr. 4, 2017

(54) CATALYST WITH IMPROVED HYDROTHERMAL STABILITY

(71) Applicant: BASF Corporation, Florham Park, NJ (US)

(72) Inventors: Wen-Mei Xue, Dayton, NJ (US); Xinyi Wei, Princeton, NJ (US); Marcus Hilgendorff, Hannover Bemerode (DE); Patrick Burk, Freehold, NJ (US)

(73) Assignee: BASF Corporation, Florham Park, NJ (US)

( * ) Notice: Subject to any disclaimer, the term of this patent is extended or adjusted under 35 U.S.C. 154(b) by 77 days.

(21) Appl. No.: 14/467,250

(22) Filed: Aug. 25, 2014

(65) Prior Publication Data

US 2014/0360171 A1    Dec. 11, 2014

Related U.S. Application Data (63) Continuation-in-part of application No. 14/204,386, filed on Mar. 11, 2014.
(Continued)

(51) Int. Cl.
*B01D 50/00* (2006.01)
*F01N 3/20* (2006.01)
(Continued)

(52) U.S. Cl.
CPC ........... *F01N 3/2066* (2013.01); *B01D 53/94* (2013.01); *B01D 53/944* (2013.01); *B01D 53/945* (2013.01); *B01D 53/9418* (2013.01); *B01J 23/002* (2013.01); *B01J 23/10* (2013.01); *B01J 23/63* (2013.01); *B01J 27/232* (2013.01); *B01J 35/002* (2013.01); *B01J 35/0006* (2013.01);
(Continued)

(58) Field of Classification Search
CPC .... F01N 3/101; F01N 2250/02; F01N 3/2066; B01J 23/002; B01J 2523/00; B01J 2255/1021; B01D 2255/9022
USPC .................................. 422/177; 502/174, 304
See application file for complete search history.

(56) References Cited

U.S. PATENT DOCUMENTS 4,965,243 A    10/1990    Yamada et al.
5,064,803 A *  11/1991    Nunan ................. B01D 53/945
                                                       502/170
(Continued)

FOREIGN PATENT DOCUMENTS

EP    0407915 A2    1/1991
EP    0716876 A1    6/1996
(Continued)

OTHER PUBLICATIONS

International Search Report dated Aug. 27, 2014.

*Primary Examiner* — Tom P Duong
(74) *Attorney, Agent, or Firm* — Womble Carlyle Sandridge & Rice LLP (57) ABSTRACT

A catalyst for the treatment of exhaust gas emissions is disclosed. The catalyst can comprise ceria-alumina particles having a ceria phase present in a weight percent of the composite in the range of about 20% to about 80% on an oxide basis, an alkaline earth metal component supported on the ceria-alumina particles, wherein the $CeO_2$ is present in the form of crystallites that are hydrothermally stable and have an average crystallite size less than 160 Å after aging at 950° C. for 5 hours in 2% $O_2$ and 10% steam in $N_2$.

14 Claims, 3 Drawing Sheets

Related U.S. Application Data (60) Provisional application No. 61/778,871, filed on Mar. 13, 2013.

(51) Int. Cl.

| | | |
|---|---|---|
| *B01J 27/232* | (2006.01) | |
| *B01D 53/94* | (2006.01) | |
| *F01N 3/10* | (2006.01) | |
| *F01N 3/035* | (2006.01) | |
| *B01J 37/02* | (2006.01) | |
| *B01J 35/00* | (2006.01) | |
| *B01J 23/63* | (2006.01) | |
| *B01J 35/02* | (2006.01) | |
| *B01J 23/00* | (2006.01) | |
| *B01J 23/10* | (2006.01) | |
| *B01J 37/10* | (2006.01) | |
| *B01J 35/04* | (2006.01) | |
| *B01J 35/10* | (2006.01) | |

(52) U.S. Cl.
CPC ......... *B01J 35/0013* (2013.01); *B01J 35/023* (2013.01); *B01J 37/0201* (2013.01); *B01J 37/0248* (2013.01); *F01N 3/035* (2013.01); *F01N 3/101* (2013.01); *B01D 2255/1021* (2013.01); *B01D 2255/1023* (2013.01); *B01D 2255/1025* (2013.01); *B01D 2255/1028* (2013.01); *B01D 2255/2042* (2013.01); *B01D 2255/2065* (2013.01); *B01D 2255/9022* (2013.01); *B01D 2255/91* (2013.01); *B01D 2258/012* (2013.01); *B01J 35/04* (2013.01); *B01J 35/1009* (2013.01); *B01J 35/1014* (2013.01); *B01J 37/10* (2013.01); *B01J 2523/00* (2013.01); *F01N 2250/02* (2013.01); *F01N 2610/02* (2013.01); *Y02C 20/10* (2013.01); *Y02T 10/22* (2013.01)

(56) References Cited

U.S. PATENT DOCUMENTS

| | | |
|---|---|---|
| 5,075,275 A | 12/1991 | Murakami et al. |
| 5,702,675 A | 12/1997 | Takeshima et al. |
| 6,221,804 B1 | 4/2001 | Yamada et al. |
| 6,296,822 B1 | 10/2001 | Hepburn et al. |
| 6,375,910 B1 | 4/2002 | Deeba et al. |
| 6,585,945 B2 | 7/2003 | Wu et al. |
| 6,777,370 B2 | 8/2004 | Chen |
| 6,923,945 B2 | 8/2005 | Chen |
| 7,490,464 B2 | 2/2009 | Li et al. |
| 7,832,203 B2 | 11/2010 | Chiffey |
| 2003/0045424 A1 | 3/2003 | Deeba et al. |
| 2004/0048741 A1 | 3/2004 | Poulston et al. |
| 2004/0198595 A1 | 10/2004 | Chen |
| 2005/0129601 A1 | 6/2005 | Li et al. |
| 2009/0297416 A1 | 12/2009 | Rohart et al. |
| 2011/0120086 A1 | 5/2011 | Gidney et al. |
| 2012/0023915 A1 | 2/2012 | Hilgendorff et al. |
| 2013/0177484 A1 | 7/2013 | Naito et al. |

FOREIGN PATENT DOCUMENTS

| | | |
|---|---|---|
| EP | 1138384 A2 | 10/2001 |
| GB | 2736903 | 12/2002 |
| JP | 2013-146693 | 8/2013 |
| WO | 2012147411 A1 | 11/2012 |

\* cited by examiner

CATALYST WITH IMPROVED HYDROTHERMAL STABILITY

CROSS-REFERENCE TO RELATED APPLICATIONS

This application is a continuation-in-part of U.S. patent application Ser. No. 14/204,386, filed on Mar. 11, 2014, which claims the benefit of priority under 35 U.S.C. §119(e) to U.S. Provisional Patent Application No. 61/778,871, filed on Mar. 13, 2013, which are hereby incorporated by reference in their entireties.

TECHNICAL FIELD

The present invention is directed to an exhaust gas purifying catalyst and methods for its use. More particularly, the invention pertains to catalysts that are resistant to thermal aging and methods of using the materials. The exhaust gas purifying catalyst may be used to treat exhaust gas streams, especially those emanating from lean burn engines.

BACKGROUND

Operation of lean burn engines, for example, diesel engines and lean burn gasoline engines, provide the user with excellent fuel economy and have low emissions of gas phase hydrocarbons and carbon monoxide due to their operation at high air/fuel ratios under fuel lean conditions. Additionally, diesel engines offer significant advantages over gasoline (spark ignition) engines in terms of their fuel economy, durability, and their ability to generate high torque at low speed.

From the standpoint of emissions, however, diesel engines present more severe problems than their spark-ignition counterparts. Because diesel engine exhaust gas is a heterogeneous mixture, emission problems relate to particulate matter (PM), nitrogen oxides ($NO_x$), unburned hydrocarbons (HC), and carbon monoxide (CO).

Emission of nitrogen oxides ($NO_x$) from lean burn engines must be reduced in order to meet emission regulation standards. Conventional three-way conversion (TWC) automotive catalysts are suitable for abating $NO_x$, carbon monoxide a (CO) and hydrocarbon (HC) pollutants in the exhaust of engines operated at or near stoichiometric air/fuel conditions. The precise proportion of air to fuel which results in stoichiometric conditions varies with the relative proportions of carbon and hydrogen in the fuel. An air-to-fuel (A/F) ratio of 14.65:1 (weight of air to weight of fuel) is the stoichiometric ratio corresponding to the combustion of a hydrocarbon fuel, such as gasoline, with an average formula $CH_{1.88}$. The symbol λ is thus used to represent the result of dividing a particular A/F ratio by the stoichiometric A/F ratio for a given fuel, so that; λ=1 is a stoichiometric mixture, λ>1 is a fuel-lean mixture and λ<1 is a fuel-rich mixture.

Engines, especially gasoline-fueled engines to be used for passenger automobiles and the like, are being designed to operate under lean conditions as a fuel economy measure. Such future engines are referred to as "lean burn engines." That is, the ratio of air to fuel in the combustion mixtures supplied to such engines is maintained above the stoichiometric ratio so that the resulting exhaust gases are "lean," i.e., the exhaust gases are relatively high in oxygen content. Although lean-burn engines provide advanced fuel economy, they have the disadvantage that conventional TWC catalysts are not effective for reducing $NO_x$ emissions from such engines because of excessive oxygen in the exhaust. Attempts to overcome this problem have included the use of a $NO_x$ trap. The exhaust of such engines is treated with a catalyst/$NO_x$ sorbent which stores $NO_x$ during periods of lean (oxygen-rich) operation, and releases the stored $NO_x$ during the rich (fuel-rich) periods of operation. During periods of rich (or stoichiometric) operation, the catalyst component of the catalyst/$NO_x$ sorbent promotes the reduction of $NO_x$ to nitrogen by reaction of $NO_x$ (including $NO_x$ released from the $NO_x$ sorbent) with HC, CO, and/or hydrogen present in the exhaust.

In a reducing environment, a lean $NO_x$ trap (LNT) activates reactions by promoting a steam reforming reaction of hydrocarbons and a water gas shift (WGS) reaction to provide $H_2$ as a reductant to abate $NO_x$. The water gas shift reaction is a chemical reaction in which carbon monoxide reacts with water vapor to form carbon dioxide and hydrogen. The presence of ceria in an LNT catalyzes the WGS reaction, improving the LNT's resistance to $SO_2$ deactivation and stabilizing the PGM; ceria in an LNT also functions as a $NO_x$ storage component.

$NO_x$ storage materials comprising barium ($BaCO_3$) fixed to ceria ($CeO_2$) have been reported, and these $NO_x$ materials have exhibited improved thermal aging properties. Ceria, however, suffers from severe sintering upon hydrothermal aging at high temperatures. The sintering not only causes a decrease in low temperature $NO_x$ storage capacity and WGS activity, but also results in the encapsulation of $BaCO_3$ and PGM by the bulk $CeO_2$. Thus, there is a need for a ceria-containing catalyst that is hydrothermally stable.

SUMMARY

Embodiments of a first aspect of the invention are directed to a catalyst. IN a first embodiment, the catalyst comprises ceria-alumina particles having a ceria phase present in a weight percent of the particles in the range of about 20% to about 80% on an oxide basis, an alkaline earth metal component supported on the ceria-alumina particles, wherein the $CeO_2$ is present in the form of crystallites that are hydrothermally stable and have an average crystallite size of less than 160 Å after aging at 950° C. for 5 hours in 2% $O_2$ and 10% steam in $N_2$.

In a second embodiment, the catalyst of the first embodiment is modified, wherein the alkaline earth metal component comprises a barium component.

In a third embodiment, the catalyst of the second embodiment is modified, wherein the barium component is selected from the group consisting of barium oxide and barium carbonate.

In a fourth embodiment, the catalyst of the first through third embodiments is modified, wherein the ceria-alumina particles are a composite of ceria and alumina.

In a fifth embodiment, the catalyst of the first through fourth embodiments is modified, further comprising at least one platinum group metal selected from the group consisting of platinum, palladium, rhodium, iridium, and mixtures thereof, supported on the ceria-alumina particles.

In a sixth embodiment, the catalyst of the fifth embodiment is modified, wherein the platinum group metal is selected from platinum, palladium, rhodium, and mixtures thereof.

In a seventh embodiment, the catalyst of the first through sixth embodiments is modified, wherein the barium component is present in an amount in the range of about 0.5% to 50% by weight on an oxide basis.

In an eighth embodiment, the catalyst of the first through seventh embodiments is modified, wherein the barium component is present in an amount in the range of about 5% to 30% by weight on an oxide basis.

In a ninth embodiment, the catalyst of the fourth embodiment is modified, wherein the composite of $CeO_2$ and $Al_2O_3$ contains ceria in an amount in the range of about 30 to 80% by weight on an oxide basis.

In a tenth embodiment, the catalyst of the fourth embodiment is modified, wherein the composite of $CeO_2$ and $Al_2O_3$ contains ceria in an amount in the range of about 50 to 80% by weight on an oxide basis.

In an eleventh embodiment, the catalyst of the fifth or sixth embodiments is modified, wherein the platinum group metal consists essentially of platinum and palladium.

In a twelfth embodiment, the catalyst of the fifth or sixth embodiments is modified, wherein the platinum group metal consists essentially of platinum.

In a thirteenth embodiment, the catalyst of the first through twelfth embodiments is modified, wherein the catalyst is selected from a three-way catalyst (TWC), diesel oxidation catalyst (DOC), gasoline particulate filter (GPF), lean $NO_x$ trap (LNT), integrated lean $NO_x$ trap-three way catalyst (LNT-TWC), or ammonia oxidation (AMOX).

A second aspect of the present invention is directed to a system. In a fourteenth embodiment, a system comprises the catalyst of the first through thirteenth embodiments and a lean burn engine upstream from the catalyst.

In a fifteenth embodiment, the system of the twelfth embodiment is modified, further comprising a second catalyst and, optionally, a particulate filter.

In a sixteenth embodiment, the system of the thirteenth embodiment is modified, wherein the second catalyst is selected from a three-way catalyst (TWC), gasoline particulate filter (GPF), selective catalytic reduction (SCR), lean $NO_x$ trap (LNT), ammonia oxidation (AMOX), SCR on a filter (SCRoF), and combinations thereof, and combinations thereof.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

According to embodiments of the invention, it has been discovered that incorporating a barium component (e.g. $BaCO_3$ and/or $BaO$) into ceria-alumina ($CeO_2/Al_2O_3$) has a tremendous stabilization effect on $CeO_2$ and, thus, provides a catalyst material with improved hydrothermal stability, higher $NO_x$ trapping capacity, and higher $NO_x$ conversion than traditional technologies.

In one or more embodiments, a catalyst comprises ceria-alumina particles having a ceria phase present in a weight percent of the composite in the range of about 20% to about 80% on an oxide basis, and an alkaline earth metal component supported on the ceria-alumina particles. The average $CeO_2$ crystallite size of the fresh and aged samples, obtained from XRD, can be used as a measurement for $CeO_2$ hydrothermal stability. Accordingly, in one or more embodiments, the $CeO_2$ is present in the form of crystallites that are hydrothermally stable and have an average crystallite size of less than 160 Å after aging at 950° C. for 5 hours in 2% $O_2$ and 10% steam in $N_2$.

With respect to the terms used in this disclosure, the following definitions are provided.

As used herein, the terms "catalyst" or "catalyst material" or "catalytic material" refer to a material that promotes a reaction.

As used herein, the terms "layer" and "layered" refer to a structure that is supported on a surface, e.g. a substrate. In one or more embodiments, the catalyst of the present invention is coated as a washcoat on a substrate or substrate member, to form a layer on a substrate.

As used herein, the term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in slurry, which is applied to a substrate, dried and calcined to provide the porous washcoat.

As used herein, the term "support" refers to the underlying high surface area material upon which additional chemical compounds or elements are carried. The support particles have pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("m²/g"), often up to about 200 m²/g or higher. Such activated alumina is usually a mixture of the gamma and delta phases of alumina, but may also contain substantial amounts of eta, kappa, and theta alumina phases. Refractory metal oxides other than activated alumina can be used as a support for at least some of the catalytic components in a given catalyst. For example, bulk ceria, zirconia, alpha alumina, silica, titania, and other materials are known for such use.

In one or more embodiments, the catalyst comprises ceria-alumina particles. The ceria-alumina particles have a ceria phase present in a weight percent of the catalyst in the range of about 20% to about 80% on an oxide basis, including 20%, 25%, 30%, 35%, 40%, 45%, 50%, 55%, 60%, 65%, 70%, 75%, or 80%. In one or more specific embodiment, the average $CeO_2$ crystallite size of the fresh and aged samples, obtained from XRD, can be used as a measurement for $CeO_2$ hydrothermal stability. Accordingly, in one or more embodiments, the $CeO_2$ is present in the form of crystallites that are hydrothermally stable and have an average crystallite size of less than 160 Å, including 160, 155, 150, 140, 130, 120, 110, 10.0, 90, 80, 70, 60, 50, 40, 30, 20, 10, and 5 Å, after aging at 950° C. for 5 hours in 2% $O_2$ and 10% steam in $N_2$. In a specific embodiment, the ceria-alumina particles include a ceria phase present in a weight percent of the composite in an amount of about 30% to 80% by weight on an oxide basis. In a very specific embodiment, the ceria-alumina particles include a ceria phase present in a weight percent of the composite in an amount of about 50% to 80% by weight on an oxide basis.

In one or more embodiments, the $CeO_2$ is present in the form of crystallites that are hydrothermally stable and are resistant to growth into larger crystallites upon aging at 950° C. As used herein, the term "resistant to growth" means that the crystallites upon aging grow to a size no larger than an average of 160 Å. In a specific embodiment, the $CeO_2$ crystallite size, as determined by XRD, after aging the catalytic article at 950° C. for 5 hours in 2% $O_2$ and 10% steam/$N_2$ is less than 160 Å. According to one or more embodiments, the $CeO_2$ crystallite size of the powder samples and the coated catalysts are different. In the coated catalysts, other washcoat components may have a stabilization effect on $CeO_2$. Therefore, after the same 950° C. aging, the $CeO_2$ crystallite size of the coated catalyst is smaller than that of the powder.

As used herein, the term "average crystallite size" refers to the mean size as determined by XRD described below.

As used herein, the term "XRD" refers to x-ray diffraction crystallography, which is a method of determining the atomic and molecular structure of a crystal. In XRD, the crystalline atoms cause a beam of x-rays to diffract into many specific directions. By measuring the angles and intensities of these diffracted beams, a three-dimensional image of the density of electrons within the crystal can be produced. From this electron density, the position of the atoms in the crystal can be determined, as well as their chemical bonds, their disorder, and other information. In particular, XRD can be used to estimate crystallite size; the peak width is inversely proportional to crystallite size; as the crystallite size gets smaller, the peak gets broader. In one or more embodiments, XRD is used to measure the average crystallite size of the $CeO_2$ particles.

The width of an XRD peak is interpreted as a combination of broadening effects related to both size and strain. The formulas used to determine both are given below. The first equation below is the Scherrer equation which is used to transform full width at half maximum intensity, FWHM, information into a crystallite size for a given phase. The second equation is used to calculate strain in a crystal from peak width information and the total width or breadth of a peak considered to be a sum of these two effects as shown in the third equation. It should be noticed that size and strain broadening vary in different fashions with regard to the Bragg angle θ. The constants for the Scherrer equation are discussed below.

$$\beta_L = \frac{K\lambda}{L\cos\theta}$$

$$\beta_e = C\varepsilon\tan\theta$$

$$\beta_{tot} = \beta_e + \beta_L = C\varepsilon\tan\theta + \frac{K\lambda}{L\cos\theta}$$

The constants for the Scherrer equation are
K: shape constant, we use a value of 0.9
L: the peak width, this is corrected for the contribution from the instrumental optics through the use of NIST SRM 660b LaB6 Line Position & Line Shape Standard
Θ: ½ of the 2θ value of the reflection of interest
λ: wavelength of radiation 1.5406 Å

As used herein, "crystallite size" is understood to be the length of the coherent scattering domain in a direction orthogonal to the set of lattice planes which give rise to the reflection. For $CeO_2$, the $CeO_2$ <111> reflection is the most intense peak in the X-ray diffraction pattern of $CeO_2$. The $CeO_2$ <111> plane of atoms intersects each of the crystallographic axes at unity and is orthogonal to the body diagonal represented by the <111> vector. So, a crystallite size of 312 Å calculated from the FWHM of the $CeO_2$ 111 reflection would be considered to be roughly 100 layers of the <111> plane of atoms.

Different directions, and thus reflections, in a crystal will generate different though close crystallite size values. The values will be exact only if the crystal is a perfect sphere. A Williamson Hall plot is used to interpret size and strain effects by considering the total peak breadth as a linear equation below with the slope of the line representing strain and the intercept being the size of a crystal.

$$\beta_{tot}\cos\theta = C\varepsilon\sin\theta + \frac{K\lambda}{L}$$

To determine the crystallite size of a material FWHM value of a single reflection or from the complete X-ray diffraction pattern is determined. Traditionally a single reflection has been fit to determine the FWHM value of that reflection, corrected the FWHM value for the contribution from the instrument, and then converted the corrected FWHM value into a crystallite size value using the Scherrer equation. This would be done by ignoring any effect from strain in the crystal. This method has been used primarily for questions concerning the crystallite size of precious metals for which we have only a single useful reflection. It should be noted that in fitting peaks it is desired to have a clean reflection which is not overlapped by reflections from other phases. This is rarely the case with present washcoat formulations Rietveld methods are now used. Rietveld methods allow the fit of complex X-ray diffraction patterns using the known crystal structures of the phases present. The crystal structures act as restraints or brakes on the fitting process. Phase content, lattice parameters, and FWHM information are varied for each phase until the overall model matches the experimental data.

In the Examples below, Rietveld methods were used to fit experimental patterns for fresh and aged samples. A FWHM curve determined for each phase in each sample was used to determine a crystallite size. Strain effects were excluded.

As used herein, the term "alkaline earth metal" refers to one or more chemical elements defined in the Periodic Table of Elements, including beryllium (Be), magnesium (Mg), calcium (Ca), strontium (Sr), barium (Ba), and radium (Ra). In one or more embodiments, the alkaline earth metal component can be incorporated into the catalyst as a salt and/or sulfate and/or oxide (e.g., $BaCO_3$, $BaSO_4$, and/or BaO) to provide an "alkaline earth metal component". It is noted that upon calcination, the barium component will convert to barium carbonate and/or barium oxide. In one or more embodiments, the alkaline earth metal component comprises a barium component. The alkaline earth metal component can be present in the washcoat in an amount in the range of about 0.5% to 50% by weight on an oxide basis, including 0.5, 1, 2, 3, 4, 5, 10, 15, 20, 25, 30, 35, 40, 45, and 50%. In a specific embodiment, the alkaline earth metal component comprises a barium component, which is present in an amount in the range of about 0.5% to about 50% by weight on an oxide basis. In other specific embodiments, the alkaline earth metal component comprises a barium component, which is present in an amount in the range of about 5% to about 30% by weight on an oxide basis.

In one or more embodiments, the $CeO_2$ crystallite size of the aged samples, obtained from XRD, was used as a measurement for alkaline earth/Ce/Al hydrothermal stability.

Figure 3:
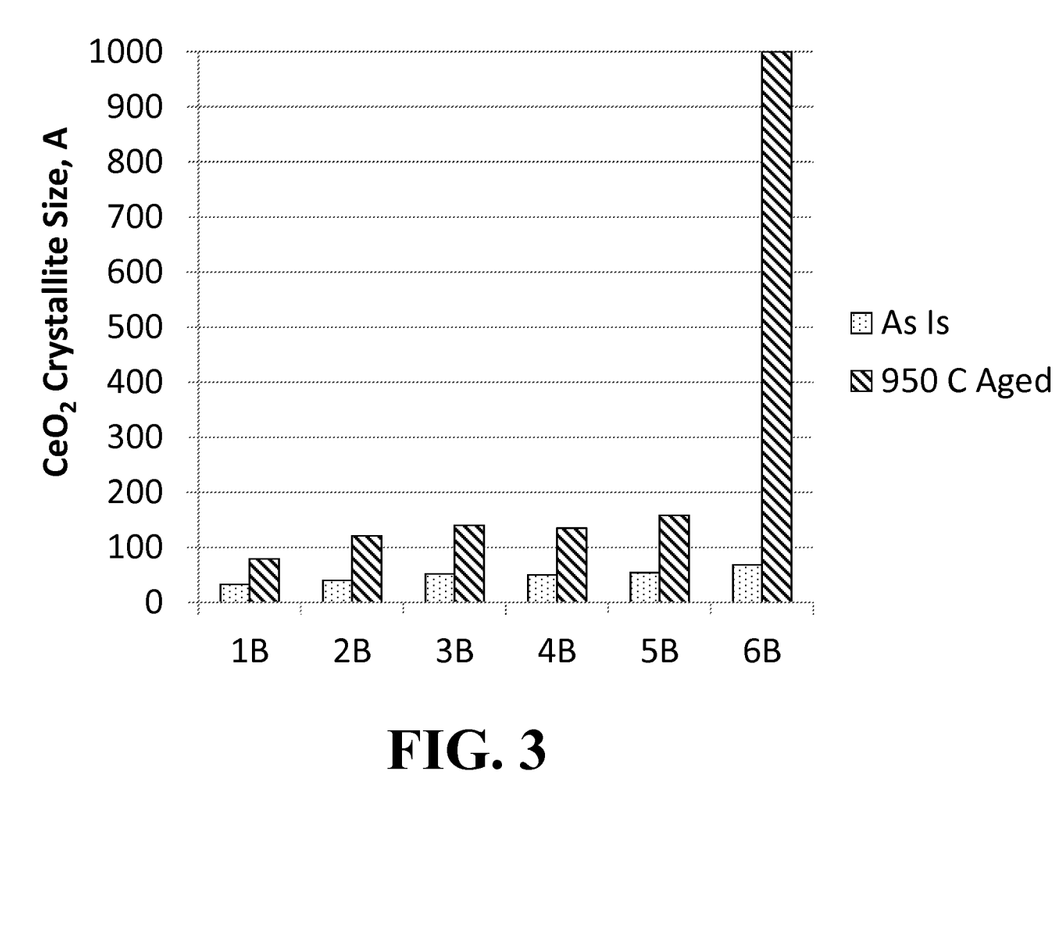
FIG. 3 is a graph of crystallite size of the $CeO_2$ as measured by XRD according to the Examples in fresh and after aging at 950° C. for 5 hours in 2% $O_2$ and 10% steam in $N_2$.
Figure 4:
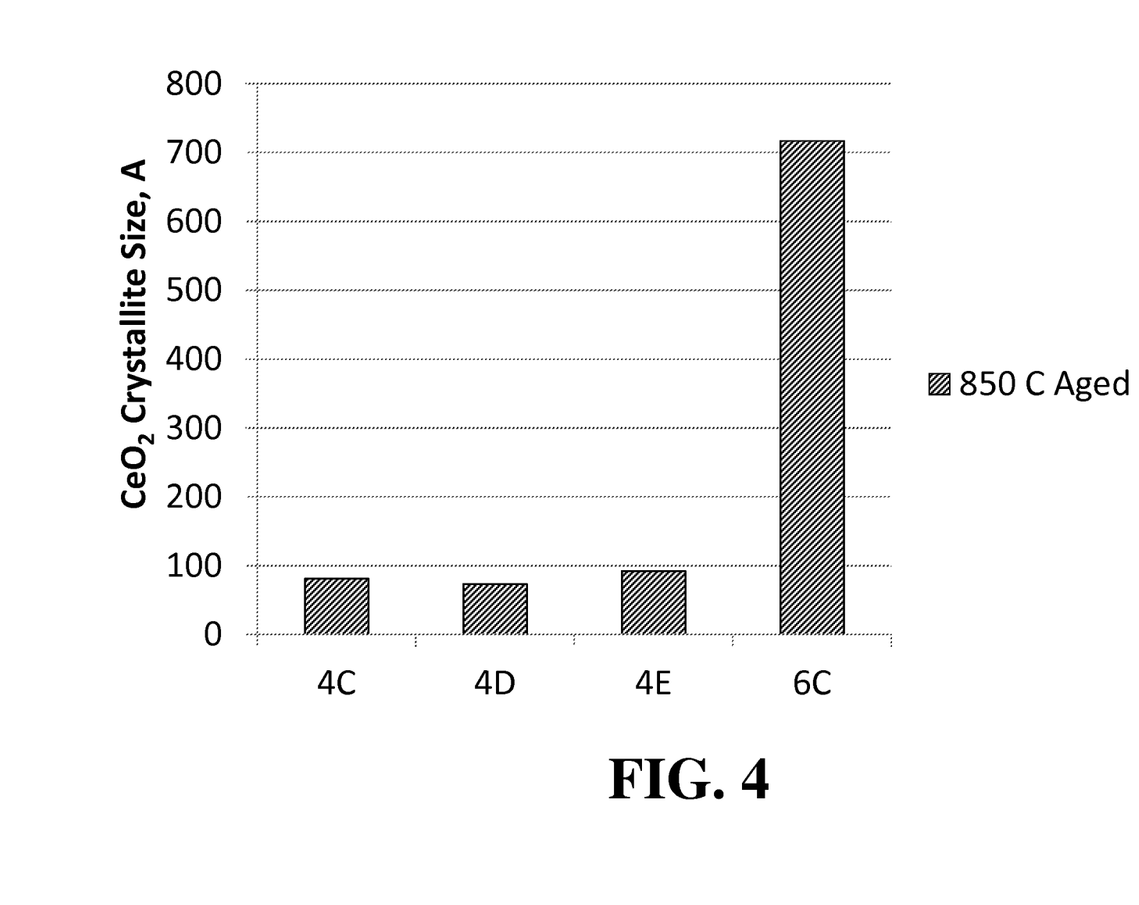
FIG. 4 is a graph of crystallite size of the $CeO_2$ as measured by XRD according to the Examples after aging at 850° C. for 8 hours in 10% steam/air.

In specific embodiments, a tremendous stabilization effect is observed when the ceria-alumina particles are impregnated with barium precursors, particularly water-soluble barium precursor salts (e.g. barium acetate), which are calcined to provide barium carbonate ($BaCO_3$) and/or barium oxide (BaO). Referring to FIG. 3, after aging at 950° C. for 5 hours in 2% $O_2$ and 10% steam in $N_2$, the $CeO_2$ crystallite sizes of the $BaCO_3/(CeO_2—Al_2O_3)$ samples were within about 75 to about 160 Å. This is remarkably lower than that of aged $BaCO_3/CeO_2$ powder (>1000 Å). Alternative $BaCO_3$ loadings were applied on 70% $CeO_2/Al_2O_3$ powder to determine if they can also provide a similar effect. Referring to FIG. 4, after aging at 850° C. for 8 hr in 10% steam/air, the samples loaded with 15, 10, and 5 wt % barium component (calculated as barium oxide) show much lower $CeO_2$ crystallite size than the $BaCO_3/CeO_2$. Overall, it appears that the barium component (e.g. $BaCO_3$ and/or BaO) has a unique stabilization effect on ceria crystallite growth in a Ba/Ce/Al system. This stabilization effect is likely beneficial, for example, for $NO_x$ trapping in LNT catalysts. The additional ceria surface area resulting from smaller crystallite sizes will allow for more low temperature ceria based $NO_x$ trapping, improve WGS, and improve PGM dispersion.

Thus, according to one or more embodiments, the ceria is destabilized in a Ba—Ce system, and is significantly stabilized in a Ba—Ce—Al system.

In one or more embodiments, without intending to be bound by theory, it is thought that the additional ceria surface area resulting from smaller crystallite sizes allows for higher $BaCO_3$ based $NO_x$ trapping due to better $BaCO_3$ dispersing, higher $CeO_2$ based $NO_x$ trapping at low temperature, improved $NO_x$ reduction due to more efficient WGS, and improved NO oxidation and $NO_x$ reduction due to better PGM dispersion. Thus, incorporating barium ($BaCO_3$ and/or BaO) into ceria-alumina ($CeO_2/Al_2O_3$) has a tremendous stabilization effect on $CeO_2$ and provides a catalyst material with improved hydrothermal stability, higher $NO_x$ trapping capacity, and higher $NO_x$ conversion than traditional technologies.

In one or more embodiments, the catalyst of the present invention exhibits improved $NO_x$ trapping capacity during lean operation and improved $NO_x$ reduction during rich regeneration, after aging at 950° C. for 5 hours in 2% $O_2$ and 10% steam/$N_2$. The improvement is over traditional catalysts that comprise ceria not incorporated with $Al_2O_3$.

In one or more embodiments, the catalyst of the invention can be utilized as a three-way catalyst (TWC), a diesel oxidation catalyst (DOC), a gasoline particulate filter (GPF), a lean $NO_x$ trap (LNT), an integrated LNT-TWC, or as an ammonia oxidation catalyst (AMOX).

In one or more embodiments, the catalyst further comprises at least one platinum group metal supported on the barium(ceria-alumina) particles. As used herein, the term "platinum group metal" or "PGM" refers to one or more chemical elements defined in the Periodic Table of Elements, including platinum, palladium, rhodium, osmium, iridium, and ruthenium, and mixtures thereof. In one or more embodiments, the platinum group metal is selected from the group consisting of platinum, palladium, rhodium, iridium, and mixtures thereof. In a specific embodiment, the platinum group metal is selected from platinum, palladium, rhodium, and mixtures thereof. Generally, there are no specific restrictions as far as the total platinum group metal content of the catalyst is concerned.

Typically, the catalyst of the present invention is disposed on a substrate. The substrate may be any of those materials typically used for preparing catalysts, and will typically comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to herein as flow-through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc.

Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The cells can have cross sections that are rectangular, square, circular, oval, triangular, hexagonal, or are of other polygonal shapes. The ceramic substrate may be made of any suitable refractory material, e.g., cordierite, cordierite-alumina, silicon nitride, or silicon carbide, or the substrates may be composed of one or more metals or metal alloys.

The catalyst according to embodiments of the present invention can be applied to the substrate surfaces by any known means in the art. For example, the catalyst washcoat can be applied by spray coating, powder coating, or brushing or dipping a surface into the catalyst composition.

In one or more embodiments, the catalyst is disposed on a honeycomb substrate.

Figure 1:
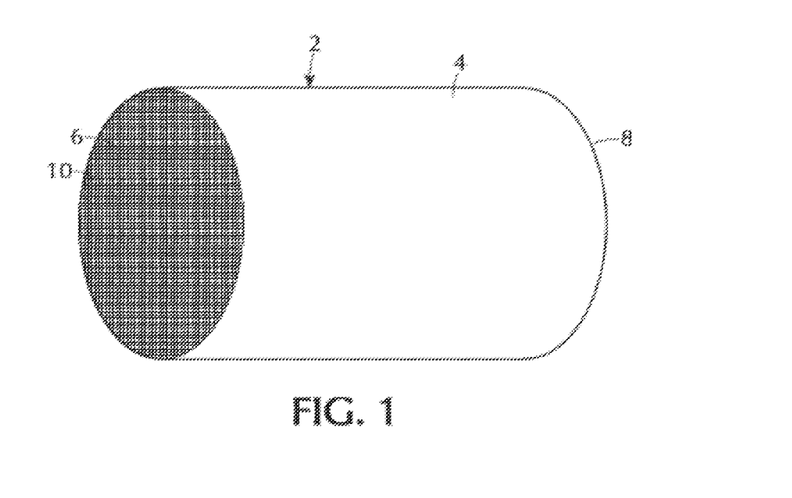
FIG. 1 is a perspective view of a honeycomb-type refractory substrate member which may comprise a washcoat composition comprising the catalyst according to an embodiment.
Figure 2:
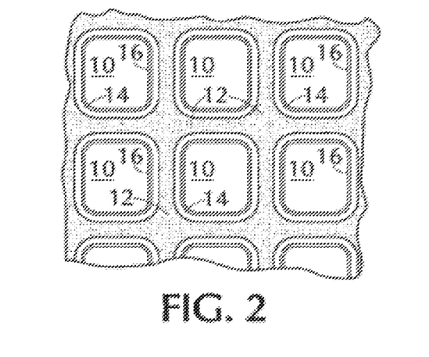
FIG. 2 is a partial cross-sectional view enlarged relative to FIG. 1 and taken along a plane parallel to the end faces of the substrate of FIG. 1, which shows an enlarged view of one of the gas flow passages shown in FIG. 1.

When applied as a washcoat, the invention may be more readily appreciated by reference to FIGS. 1 and 2. FIGS. 1 and 2 show a refractory substrate member 2, in accordance with one embodiment of the present invention. Referring to FIG. 1, the refractory substrate member 2 is a cylindrical shape having a cylindrical outer surface 4, an upstream end face 6 and a downstream end face 8, which is identical to end face 6. Substrate member 2 has a plurality of fine, parallel gas flow passages 10 formed therein. As seen in FIG. 2 flow passages 10 are formed by walls 12 and extend through substrate from upstream end face 6 to downstream end face 8, the passages 10 being unobstructed so as to permit the flow of a fluid, e.g., a gas stream, longitudinally through substrate via gas flow passages 10 thereof. A discrete catalyst layer 14, which in the art and sometimes below is referred to as a "washcoat", is adhered or coated onto the walls 12 of the substrate member. In some embodiments, an additional catalyst layer 16 is coated on top of the catalyst layer 14. The second catalyst layer 16 can be the same composition as the catalyst layer 14, or the second catalyst layer 16 can comprise a distinct catalyst composition.

As shown in FIG. 2, the substrate member includes void spaces provided by the gas-flow passages 10, and the cross-sectional area of these passages 10 and the thickness of the walls 12 defining the passages will vary from one type of substrate member to another. Similarly, the weight of washcoat applied to such substrates will vary from case to case. Consequently, in describing the quantity of washcoat or catalytic metal component or other component of the composition, it is convenient to use units of weight of component per unit volume of substrate. Therefore, the units of grams per cubic inch ("g/m$^3$") and grams per cubic foot ("g/ft$^3$") are used herein to mean the weight of a component per volume of the substrate member, including the volume of void spaces of the substrate member.

In a second aspect of the invention, the catalyst of one or more embodiments can be used in an integrated emission treatment system comprising one or more additional components for the treatment of exhaust gas emissions. For example, the emission treatment system may comprise a lean burn engine upstream from the catalyst of one or more embodiments, and may further comprise a second catalyst and, optionally, a particulate filter. In one or more embodiments, the second catalyst is selected from a three-way catalyst (TWC), gasoline particulate filter (GPF), selective catalytic reduction (SCR), lean NO$_x$ trap (LNT), ammonia oxidation (AMOX), SCR on a filter (SCRoF), and combinations thereof. In one or more embodiments, the particulate filter can be selected from a gasoline particulate filter, a soot filter, or a SCRoF. The particulate filter may be catalyzed for specific functions. The catalyst can be located upstream or downstream of the particulate filter.

In one or more embodiments, the emission treatment system may comprise a lean burn engine upstream from the catalyst of one or more embodiments, and may further comprise a TWC. In one or more embodiments, the emission treatment system can further comprise an SCR/LNT.

In a specific embodiment, the particulate filter is a catalyzed soot filter (CSF). The CSF can comprise a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica alumina, zirconia, and zirconia alumina) and/or an oxidation catalyst (e.g., a ceria-zirconia) for the combustion of unburned hydrocarbons and to some degree particulate matter. In one or more embodiments, the soot burning catalyst is an oxidation catalyst comprising one or more precious metal (PM) catalysts (platinum, palladium, and/or rhodium).

In general, any known filter substrate in the art can be used, including, e.g., a honeycomb wall flow filter, wound or packed fiber filter, open-cell foam, sintered metal filter, etc., with wall flow filters being specifically exemplified. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The porous wall flow filter used in embodiments of the invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1

Preparation of Catalyst

CeO$_2$—Al$_2$O$_3$ particles (1A through 5A) were impregnated with a barium acetate solution to provide samples 1B through 5B having BaCO$_3$/(CeO$_2$—Al$_2$O$_3$) with a BaCO$_3$ content as specified in Table 1. The mixture was dried at 110° C. and calcined at 720° C. for 2 hours.

CeO$_2$—Al$_2$O$_3$ particles (4A) were impregnated with a barium acetate solution to provide 4C through 4E having BaCO$_3$/(CeO$_2$—Al$_2$O$_3$) with a BaCO$_3$ content as specified in Table 1. The mixture was dried at 110° C. and calcined at 620° C. for 2 hours.

CeO$_2$ particles (6A) were impregnated with a barium acetate solution to provide 6B and 6C having BaCO$_3$/CeO$_2$ with a BaCO$_3$ content as specified in Table 1. The mixture was dried at 110° C. and calcined at 600° C. for 2 hours.

Referring to FIG. 3, after aging at 950° C. for 5 hours in 2% O$_2$ and 10% steam in N$_2$, the CeO$_2$ crystallite sizes of the BaCO$_3$/(CeO$_2$—Al$_2$O$_3$) samples 1B-5B were within 79 to 158 Å.

Referring to FIG. 4, the CeO$_2$ crystallite sizes of the BaCO$_3$/(CeO$_2$—Al$_2$O$_3$) samples 4C through 4E were within 73 to 92 Å after aging at 850° C. for 8 hours in 10% steam in air.

Table 1 shows the content of 1A through 6A, and 1B through 6B, 6C, 4C through 4E.

TABLE 1

| Sample | BaCO$_3$ wt % | CeO$_2$ wt % | Al$_2$O$_3$ wt % | BET Surface Area, m$^2$/g | |
|---|---|---|---|---|---|
| | | | | As is | 950° C. aged* |
| 1A | 0 | 30 | 70 | | |
| 2A | 0 | 50 | 50 | | |
| 3A | 0 | 60 | 40 | | |
| 4A | 0 | 70 | 30 | | |
| 5A | 0 | 80 | 20 | | |
| 6A | 0 | 100 | 0 | 167 | 27 |
| 1B | 26 | 22 | 52 | 122 | 79 |
| 2B | 26 | 37 | 37 | 119 | 66 |
| 3B | 26 | 44 | 30 | 93 | 39 |
| 4B | 26 | 52 | 22 | 78 | 33 |
| 5B | 26 | 59 | 15 | 76 | 21 |
| 6B | 26 | 74 | 0 | 83 | 3 |
| 4C | 19 | 57 | 24 | | |

TABLE 1-continued

| Sample | BaCO$_3$ wt % | CeO$_2$ wt % | Al$_2$O$_3$ wt % | BET Surface Area, m$^2$/g As is | 950° C. aged* |
|---|---|---|---|---|---|
| 4D | 13 | 61 | 26 | | |
| 4E | 6 | 66 | 28 | | |
| 6C | 19 | 81 | 0 | | |

*Aging conditions: 950° C. for 5 hours in 2% O$_2$ and 10% steam in N$_2$

Example 2

XRD Measurement

The CeO$_2$ crystallite size of the Example 1 samples was measured by XRD. The samples were ground using a mortar and pestle. The resultant powders were then back packed into flat plate mounts for analysis. A θ-θ PANalytical X'Pert Pro MPD X-ray diffraction system was used to collect data in Bragg-Brentano geometry. The optical path consisted of the X-ray tube, 0.04 rad soller slit, ¼° divergence slit, 15 mm beam mask, ½° anti-scatter slit, the sample, ¼° anti-scatter slit, 0.04 rad soller slit, Ni$^0$ filter, and a PIXcel linear position sensitive detector with a 2.114° active length. Cu$_{k\alpha}$ radiation was used in the analysis with generator settings of 45 kV and 40 mA. X-ray diffraction data was collected from 10° to 90° 2θ using a step size of 0.026° and a count time of 600 s per step. Phase identification was done using Jade software. All numerical values were determined using Rietveld methods.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. An emission treatment system comprising:
   a catalyst including a catalyst composition comprising ceria-alumina particles having a ceria phase present in a weight percent of the particles in the range of about 20% to about 80% on an oxide basis, an alkaline earth metal component supported on the ceria-alumina particles, wherein the CeO$_2$ is present in the form of crystallites that are hydrothermally stable and have an average crystallite size of less than 160 Å after aging at 950° C. for 5 hours in 2% O$_2$ and 10% steam in N$_2$; a lean burn engine located upstream from the catalyst composition; and a second, different catalyst.

2. The emission treatment system of claim 1, further comprising a particulate filter.

3. The emission treatment system of claim 1, wherein the second, different catalyst is selected from a three-way catalyst (TWC), a gasoline particulate filter (GPF), a selective catalytic reduction (SCR) catalyst, a lean NO$_x$ trap (LNT), an ammonia oxidation (AMOX) catalyst, a SCR on a filter (SCRoF), and combinations thereof.

4. The emission treatment system of claim 1, wherein the alkaline earth metal component comprises a barium component.

5. The emission treatment system of claim 4, wherein the barium component is selected from the group consisting of barium oxide and barium carbonate.

6. The emission treatment system of claim 4, further comprising at least one platinum group metal selected from the group consisting of platinum, palladium, rhodium, iridium, and mixtures thereof, supported on the ceria-alumina particles.

7. The emission treatment system of claim 6, wherein the platinum group metal is selected from platinum, palladium, rhodium, and mixtures thereof.

8. The emission treatment system of claim 6, wherein the platinum group metal consists essentially of platinum and palladium.

9. The emission treatment system of claim 6, wherein the platinum group metal consists essentially of platinum.

10. The emission treatment system of claim 4, wherein the barium component is present in an amount in of about 0.5% to 50% by weight on an oxide basis.

11. The emission treatment system of claim 10, wherein the barium component is present in an amount of about 5% to 30% by weight on an oxide basis.

12. The emission treatment system of claim 1, wherein the ceria-alumina particles are a composite of ceria and alumina.

13. The emission treatment system of claim 12, wherein the composite of ceria and alumina contains ceria in an amount of about 30% to 80% by weight on an oxide basis.

14. The emission treatment catalyst of claim 12, wherein the composite of ceria and alumina contains ceria in an amount of about 50% to 80% by weight on an oxide basis.

* * * * *

UNITED STATES PATENT AND TRADEMARK OFFICE
CERTIFICATE OF CORRECTION

PATENT NO. : 9,611,774 B2  
APPLICATION NO. : 14/467250  
DATED : April 4, 2017  
INVENTOR(S) : Wen-Mei Xue et al.

It is certified that error appears in the above-identified patent and that said Letters Patent is hereby corrected as shown below:

In Page 2, Item (56), References Cited, Foreign Patent Documents, Cite No. 2, delete "GB 2736903 12/2002" and insert --GB 2376903 12/2002--, therefor.

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*